Sept. 25, 1962 D. M. WILLYOUNG ET AL 3,056,055
LIQUID-COOLED DYNAMOELECTRIC MACHINE ROTOR
Filed June 19, 1961
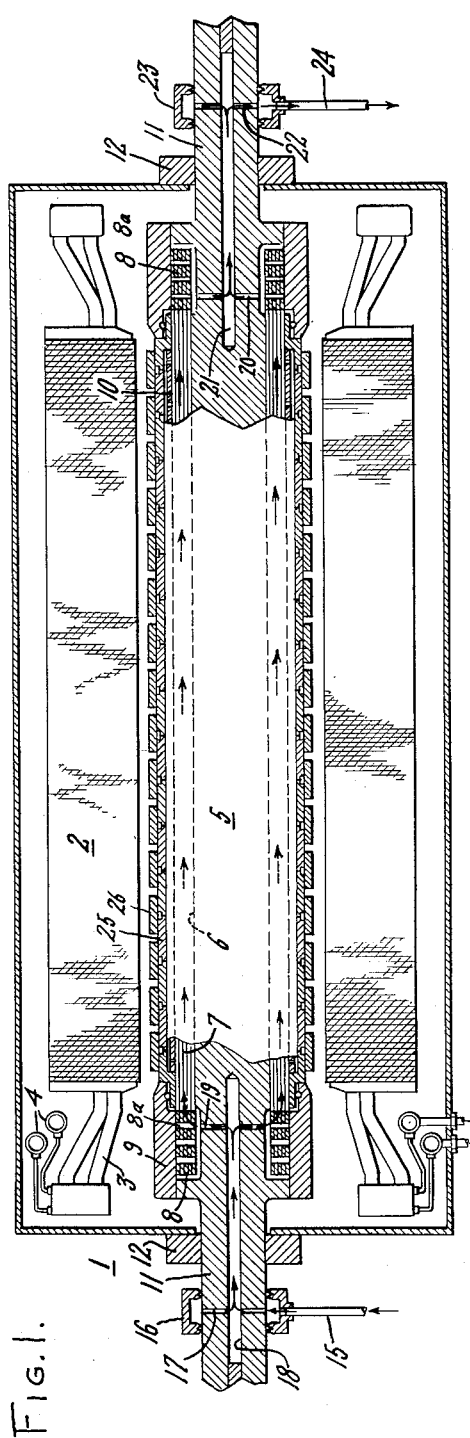
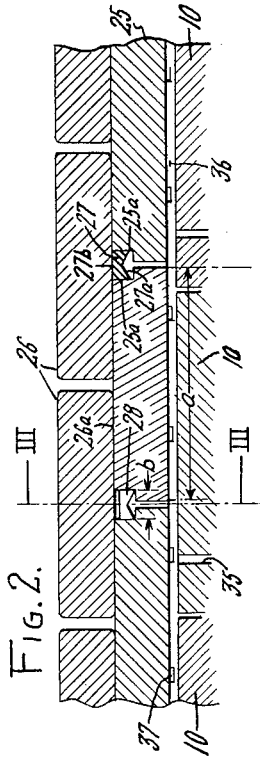
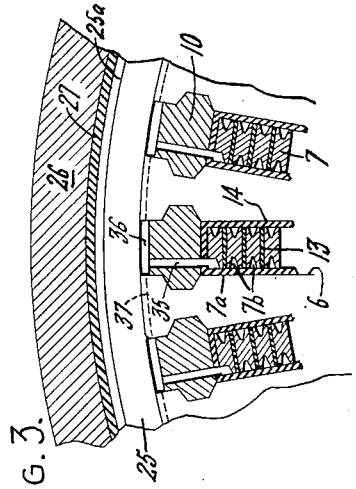
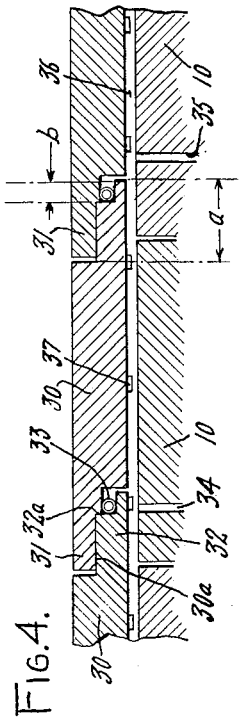
INVENTORS
DAVID M. WILLYOUNG
EDWARD E. GIBBS
BY W. C. Crutch
THEIR ATTORNEY United States Patent Office 3,056,055
Patented Sept. 25, 1962

3,056,055
LIQUID-COOLED DYNAMOELECTRIC
MACHINE ROTOR
David M. Willyoung, Scotia, and Edward E. Gibbs, Schenectady, N.Y., assignors to General Electric Company, a corporation of New York
Filed June 19, 1961, Ser. No. 117,895
5 Claims. (Cl. 310—61)

This invention relates to a rotor for a dynamoelectric machine which is cooled by liquid circulating in direct contact or in heat exchange relationship with the field windings in the rotor slots, and more particularly to an improved structure for preventing leakage of the liquid from the rotor.

In a large dynamoelectric machine, such as a turbine-generator, increased capability of the generator can be achieved by "direct-cooling" the field windings on the rotor by means of a gas or liquid. By "direct-cooling" is meant that the coolant is circulated inside the main slot insulation in direct contact with the windings or through tubes disposed in heat exchange relationship with the windings, the cooling conduits sometimes being passages in the strands themselves.

Two types of liquid cooling schemes have been proposed. One confines the liquid in a closed pressurized circuit, usually through hollow strands. An example of such an arrangement may be seen in copending application, Serial No. 25,263, filed in the names of David M. Willyoung and Peter A. Becker on April 28, 1960. The other type, which is sometimes called a "flooded" construction, depends upon enclosing the entire rotor and the end turns of the windings, and circulating the liquid through appropriate passages inside the main slot insulation. With the latter type of construction, the outer container is subjected to severe stresses due to the liquid pressure, as well as due to the weight of the container itself, and special precautions are necessary to prevent leakage. An example of such a construction may be seen in U.S. Patent 3,049,633 issued to Bernard M. Cain on August 14, 1962, and assigned to the assignee of the present application. In that application, a liquid barrier was provided by a thin integral sheath extending the entire length of the rotor. Since leakage from the tops of the slots, around and between the wedges is a possibility, some sort of outer enclosure on the rotor to prevent leakage is a necessity. Manufacturing convenience may suggest that the outer enclosure be assembled in short sections or rings; however, this immediately presents the problem of sealing against leakage between rings.

Accordingly, one object of the invention is to provide an improved arrangement for preventing leakage of liquid from a dynamoelectric machine rotor.

Another object of the invention is to provide an enclosure for a liquid-cooled dynamoelectric machine rotor comprising relatively short ring sections which can be sealed to prevent leakage of the liquid coolant from the slots.

Still another object of the invention is to disclose an improved construction for increasing the security of the liquid seal in a flooded generator rotor as the rotor increases in speed.

The subject matter which is regarded as the invention is particularly pointed out and distinctly claimed in the concluding portion of this specification. The invention, however, both as to organization and method of practice, together with further objects and advantages thereof, may best be understood by reference to the following description taken in connection with the accompanying drawing in which:

FIG. 1 is a horizontal view, partly in section, of a fully liquid-cooled dynamoelectric machine;

FIG. 2 is an enlarged horizontal view in cross-section of a portion of the rotor periphery;

FIG. 3 is a cross-sectional view looking axially along the rotor taken along lines III—III of FIG. 2; and FIG. 4 is a modification of the invention showing an enlarged horizontal view of the rotor periphery in cross section.

Briefly stated, the invention is practiced by providing a series of relatively short rings about the rotor periphery which have coaxial overhanging or overlapping portions. Liquid is specifically distributed on the inner surface of the inner lapped portions. Sealing rings are employed at a substantial distance from the ends of the overlapping portions. Liquid pressure causes the inner portions to expand more than the outer overlapping portions as the speed of rotation increases, thereby increasing the effectiveness of the liquid seal.

Referring now to FIG. 1 of the drawing, a dynamoelectric machine 1 comprises a stator core 2 having windings 3 which are internally cooled by a liquid circulating through supply and discharge manifolds 4. A rotor 5 includes a number of circumferentially spaced longitudinal slots 6 in which are disposed the generator field windings 7. The end turns 8 of the field windings are held in place by a heavy retaining ring 9 and the slot portions of windings 7 are held in place by wedges 10 in the conventional manner. Rotor 5 turns on shaft portion 11 in bearings 12. Suitable electrical leads (not shown) supply excitation to field windings 7.

The slot portions of the rotor windings are provided with longitudinal cooling passages in order to conduct liquid coolant in heat exchange relationship with the field windings so as to cool them.

Referring to FIG. 3 of the drawing, one suitable construction may be seen for providing coolant passages longitudinally along the rotor to conduct the liquid coolant in contact with windings 7. Windings 7 comprise strands 7a having longitudinal grooves 7b separated from one another by light turn insulation 13. Thus the grooves 7b define longitudinal passageways inside the main ground insulation 14.

Referring again to FIG. 1, means are provided to supply liquid coolant to cool end turns 8 and the slot portion of windings 7. A liquid supply pipe 15 feeds annular chamber 16, whence liquid flows radially inward through passage 17 into spindle 11, along bore-hole 18, radially outward through passage 19 to the end-turn chamber 8a. From there it flows longitudinally through grooves 7b as indicated by the arrows, to the end-turn chamber 8a at the other end of the rotor. From there it flows radially inward through passage 20, along bore-hole 21, radially outward through passage 22 to annular collecting chamber 23, and thence from discharge pipe 24.

It will be appreciated that there is a possibility of some of the liquid coolant flowing around or between the wedges and out the tops of winding slots 6, and causing damage to the stator. The liquid pressures conducive to such leakage are very great, perhaps of the order of 2100 p.s.i. in a 39-inch diameter rotor turning at 3600 r.p.m., assuming transil oil as the coolant with a specific weight of .85. In order to withstand the liquid pressures, while at the same time allowing ease of assembly of the outer enclosure, a number of short rings having overlapping portions are employed.

In FIG. 1, the enclosure comprises a set of abutting inner rings 25 and on the outside of them, a set of overlapping outer rings 26. Outer rings 26 are offset from inner rings 25 so that the abutting ends of rings 25 are located near the mid-points of rings 26. Rings 26 are shrunk in place on rings 25 along the line 26a.

The details of the FIG. 1 arrangement may be seen more clearly by reference to the enlarged view of FIG. 2, where it can also be seen that the abutting ends of inner rings 25 are furnished with annular grooves 25a, which cooperate to form a circumferential groove for a special gasket ring 27. Gasket 27 is a continuous ring of deformable material having inner chevron-type faces 27a exposed to the fluid pressure in the space between rings 25 and flat on its outer circumference 27b, to conform to outer ring 26. Suitable material for gasket ring 27 would be Buna N rubber. The gasket ring 27 is manufactured to be of a smaller diameter than circumferential groove 25a, so that it will be recessed in the groove when assembled as indicated by the unsectioned ring 28 to the left in FIG. 2. However, as pressure is applied to its underside, as will be explained, it will assume the position shown in section to the right in FIG. 2. This feature is to protect seal 28 from the heat when outer ring 26 is shrunk to inner ring 25.

Instead of attempting to prevent the liquid from leaking around the wedges, it is specifically conducted through the wedges by means of radial holes 35 (see FIG. 3). It thus can flow outside the wedges along axially running ducts 36 between the shortened wedge tops and inner rings 25. In lieu of radial holes 35 in wedges 10, the liquid could be conducted into longitudinal ducts 36 at the end of the rotor at the same general location where the liquid enters the strand grooves 7b. Circumferential grooves 37 are provided in the rotor teeth to cross-connect the ducts 36. Thus the network of passages 36, 37 distribute liquid over the inner surface of inner rings 25.

It will be observed that the underside or radially inner portion of inner ring 25 is subjected to liquid pressure over the dimensions indicated by "a." The liquid also contacts gasket ring 27 and moves it radially outward to initially block the escape of liquid between rings 25. It will be observed that since the seal 27 blocks liquid from most of the underside or radially inner part of outer rings 26, outer rings 26 will be subjected to liquid pressure only over the length "b."

A modified form of the invention is shown in FIG. 4, which is analogous to FIG. 2. Instead of two layers of short rings, a single layer of rings 30 is employed. Rings 30, however, have alternating overhanging portions 31 and underlying portions 32 which perform the same function as inner and outer rings 25, 26 respectively in FIG. 2.

The free ends of underlying portions 32 of rings 30 are provided with circumferential recesses 32a near the thick portion of the rings, in which are disposed annular metallic O rings 33. These sealing rings 33 are arranged so that one side of the ring is exposed to the pressure in the gap 34 between abutting rings 30. The contacting surfaces of overhanging portion 31 and underlying portion 32 are tightly fitted together, preferably shrunk in place, along line 30a. The metallic O ring resists the heat required to accomplish the shrink fit. Considering now only the overlapping or thin portions 31, 32 as "free-bodies," it will be observed that the underlying portion 32 is subjected to liquid pressure along dimension "a" while overhanging portion 31 is subjected to liquid pressure only in the vicinity of the seal as indicated by dimension "b."

The operation of the improved sealing construction for a liquid-cooled rotor may be described as follows: Although the primary purpose of the structure is to prevent leakage of the liquid, while at the same time employing short ring sections which are easily assembled, no attempt is made to block the flow of liquid to the undersides of the ring members, such as by attempting to channel the flow at the ends of the rotor body. To the contrary, the liquid is specifically conducted to the underside of the ring members by means of the axially running ducts 36 above the shortened wedge tops and the circumferential connecting grooves 37 in the rotor teeth. By the network of crisscrossing passages 36, 37, the undersides of inner rings 25 are effectively subjected to the very great liquid pressures which result from the rotation of the rotor. These pressures increase with the speed of the rotor and become on the order of 2000 p.s.i. for the example given in the specification. The liquid pressure subjects the rings to a circumferential or "hoop" stress. The "hoop" stress stretches the ring circumferentially which, of course, results in its diameter increasing.

A very large portion of the total stress in the rings results from the weight of the rings themselves. Assuming a "thin ring," this component of the stress is independent, to a certain extent, of the ring thickness and may be found by the formula $$S=\frac{\rho\omega^2 r^2}{g}$$

where $\rho$ is the density of the ring material in pounds per cubic foot, $\omega$ is the angular velocity of the rotor in radians per second, $g$ is the acceleration constant for gravity, and $r$ is the radius of the ring in feet. This stress will also increase the diameter of the rings, and it causes the larger radius ring to expand a greater radial distance than a smaller radius ring.

If one ring is shrunk over another ring, and the two are rotated, they will separate from one another at a given speed which can be pre-calculated. In other words, the shrink fit pressure decreases as the speed increases and makes the joint less tight. Hence, although a shrink fit can prevent leakage when the rotor is not turning, it becomes more unreliable as the rotor increases in speed.

According to the present invention, however, the inner ring is specifically subjected to an additional stress or load which increases with speed, i.e., the liquid pressure load, while the outer or overlapping ring portion is carefully prevented from being subjected to the liquid pressure by means of the gasket rings 27 in FIG. 2, and O rings 33 in FIG. 4.

In FIG. 2, for example, the overlapping portions of the outer rings 26 on either side of the dimension "b" are not subjected to the liquid pressure, which increases with speed, whereas the undersides of rings 25 are subjected to this pressure. Therefore, as speed increases, although both rings 25 and 26 will expand radially due to their own weight, and although the shrink fit surfaces 26a would normally tend to separate more and more as the speed increases, the additional component of stress on the inner rings 25 due to the liquid pressure causes the inside rings to expand at a faster rate than the outside rings. Hence, the rings will grip one another more tightly at the shrink interface 26a to further insure against any leakage of liquid.

A similar action takes place with the modification of FIG. 4, considering the overlapping portions 31, 32 as "free bodies." In other words, rings 30 expand due to their own weight as the rotor speed increases. Overlapped portions 31, 32, which are assembled with a shrink fit at 30a, normally would tend to separate upon increase of speed. However, the seal 35, located some distance from the end of overlapping portion 31, results in the underside of portion 32 being subjected to the liquid pressure, while preventing most of the underside of overhanging portion 31 from being subjected to this liquid pressure. The overlapping portions 31 tend to expand less, relatively speaking, than all of the other portions of the rings and grip the underlying portions 32 more and more tightly as the speed increases. The radii and dimensions of portions 31, 32 can, of course, with due regard to rotor speed and diameter, be selected by those skilled in the art so that the fluid pressure results in a net increase in the gripping action between portions 31, 32 as the rotor speed increases.

Thus, it will be seen that by specifically admitting, rather than attempting to exclude the liquid from the space above the wedge slots, use is made of the liquid itself to accomplish the sealing. The use of the liquid in this manner allows the outer enclosure of a liquid-cooled dynamo-electric machine rotor to be assembled with short ring sections rather than a single long sheath. The use of either two layers of overlapping rings as shown in FIG. 2 or a single layer of rings with overlapping portions, as shown in FIG. 4, greatly simplifies the problems of assembling a liquid-cooled rotor.

While there have been described only two modifications of the invention, it will be understood that various other modifications may be made therein, and it is intended to cover in the appended claims all such modifications as fall within the scope of the invention.

What we claim as new and desire to secure by Letters Patent of the United States is:

1. A liquid-cooled dynamoelectric machine rotor comprising a rotor body defining a plurality of circumferentially spaced, axially extending slots, a winding disposed in said slots, first conduit means conducting liquid coolant in heat exchange relationship with said winding, a plurality of first ring portions around the rotor body abutting axially end-to-end along the rotor, said rotor body defining passageways between the rotor outer periphery and the inside of the first ring portions, second conduit means conducting liquid coolant to said passageways, whereby the inside of the first ring portions are subjected to increasing liquid pressure as the speed of the rotor increases, a plurality of second ring portions each providing a cylindrical axial extension on the outside of said first ring portions and tightly engaging same, and sealing means located a substantial axial distance from the ends of said axial extensions, whereby the axial extensions of the second ring portions will not be subjected to liquid pressure and will therefore engage the first ring portions more tightly as the rotor speed increases.

2. The combination according to claim 1 where the first ring portions comprise a first inner layer of rings and where the second ring portions comprise a coaxial outer layer of rings offset axially to cover the joints between the first layer rings.

3. The combination according to claim 1 wherein the first and second ring portions are each integral portions of rings disposed in a single layer along the rotor, and wherein said cylindrical axial extensions comprise outer portions of said rings which overlap reduced diameter portions of adjacent rings.

4. A liquid-cooled dynamoelectric machine rotor comprising a rotor body defining a plurality of circumferentially spaced axially extending slots, a winding disposed in said slots, conduit means conducting liquid coolant in heat exchange relationship with said winding, a plurality of inner ring members around the rotor body disposed axially end-to-end along the rotor, said rotor body defining passageways between the rotor outer periphery and the inner surfaces of said inner rings, second conduit means conducting liquid coolant to said passageways whereby the inner rings are subjected to increasing liquid pressure as the speed of the rotor increases, said inner rings together defining circumferential grooves at their outer peripheries, a plurality of outer rings disposed end to-end along the rotor body and offset axially from the inner rings to cover said circumferential grooves, near the midpoints of said outer rings, whereby portions of the outer rings extend axially on either side of said circumferential grooves, said outer rings being shrunk on said inner rings, and expandable gasket rings disposed in said circumferential grooves and blocking liquid coolant from flowing between inner and outer rings, whereby the axially extending portions of the outer rings will not be subjected to liquid pressure but will grip the inner rings more tightly as the rotor speed increases.

5. A liquid-cooled dynamoelectric machine rotor comprising a rotor body defining a plurality of circumferentially spaced axially extending slots, a winding disposed in said slots, conduit means conducting liquid coolant in heat exchange relationship with said winding, a plurality of rings around the rotor body disposed axially end-to-end along the rotor, said rotor body defining passageways between the rotor outer periphery and the inner surfaces of the rings, second conduit means conducting liquid coolant to said passageways, whereby the inner surfaces of the rings are subjected to increasing liquid pressure as the speed of the rotor increases, each two adjacent rings including integral axially extending outermost and innermost cylindrical portions tightly overlapping one another with a shrink fit, said overlapping portions defining a circumferential groove therebetween a substantial distance from the ends of the outermost portions, and a heat resistant sealing ring disposed in said circumferential groove and blocking the flow of liquid coolant between said outer and inner cylindrical portions, whereby the outer portions will not be subjected to liquid pressure and will grip the inner portions more tightly as the rotor speed increases.

No references cited.